Patented Nov. 28, 1933

1,936,985

UNITED STATES PATENT OFFICE 1,936,985

PHOSPHOROUS AND PHOSPHORIC ACID ESTERS

Wilhelm Lommel, Wiesdorf-on-the-Rhine, and Rudolf Engelhardt, Leverkusen-on-the-Rhine, Germany, assignors to I. G. Farbenindustrie Aktiengesellschaft, Frankfort - on - the - Main, Germany, a corporation of Germany No Drawing. Application July 22, 1930, Serial No. 469,925, and in Germany July 31, 1929

4 Claims. (Cl. 260—98)

The present invention relates to a process of preparing esters of the phosphorous and of the phosphoric acids containing chlorine or bromine and to new products obtainable thereby.

According to the process of the present invention phosphorous or phosphoric acid esters containing chlorine or bromine are obtainable by causing a compound of the general formula:

wherein X stands for hydrogen or an alkyl group which may be further substituted by a halogen atom having an atomic weight between 30 and 80 to be reacted upon by a compound of the general formula:

wherein Z stands for $\equiv$P or $\equiv$P=O and Hal for a halogen atom of the atomic weight between 30 and 80.

The reaction temperature may vary in wide limits; best results are obtained when the reaction is performed at about the boiling point of the alkylene oxide used. The starting materials can be employed in about stoichiometric proportions, that is to say, for obtaining a neutral ester about 3 mols of alkylene oxide are used for esterifying one mol of phosphorus trihalogenide or phosphorus oxyhalogenide. In some cases the addition of "chlorination" catalysts (see "Lassar-Cohn, Arbeitsmethoden für organisch-chemische Laboratorien 1923, 5. Auflage, spezieller Teil, page 272") will favorably influence the reaction.

According to the process of this invention compounds are obtainable which correspond to the general formula

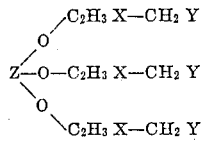

wherein Z stands for $\equiv$P or $\equiv$PO, X stands for chlorine or bromine and Y stands for hydrogen, chlorine or bromine. The new esters are products of oily consistency the viscosity of which increases with increasing C-content. They are only distillable in the vacuum, the tri(dichloropropyl) phosphate for instance boiling at a vacuum of 2 mm at 67° C. Absolutely neutral products are only obtainable when water is excluded. The phosphites are slowly hydrolyzed by cold water, while the phosphates are much more stable.

The products according to the present invention may find useful application as impregnating and softening agents, capable of reducing the inflammability of organic materials if incorporated therewith.

The following examples illustrate our invention without restricting it thereto:

Example 1.—150 parts by weight of ethylene oxide are passed in a slow current with cooling into 140 parts by weight of phosphorus trichloride, which is cooled to —5 to —10° C. The reaction proceeds without evolution of hydrochloric acid. Any excess of ethylene oxide is removed by gradually heating the reaction product. Neutral tri-(chloro ethyl) phosphite remains behind in approximately quantitative yield. Its boiling point is about 50° C. at 12 mm.

Instead of ethylene oxide propylene oxide, for example, can likewise be employed.

The respective phosphate is obtained when using phosphorus oxychloride instead of phosphorus trichloride.

Example 2.—150 parts by weight of phosphorus oxychloride are slowly run in with stirring at 100° C. into 400 parts by weight of epichlorhydrin to which 1% of iron filings have been added, and stirring is continued for half an hour. The excess of epichlorhydrin is distilled off in a vacuo, and the liquid residue is separated by pressing with the addition of charcoal. The filtrate is mixed with potassium carbonate, whereby the potassium salt of an acid ester separates. After repeated pressing the neutral tri-(dichloropropyl) phosphoric acid ester is obtained in a yield amounting to 80% of the theoretical, calculated on the phosphorus oxychloride.

On decreasing the quantity of epichlorhydrin the proportion of acid ester increases.

Example 3.—270 parts by weight of phosphorus tribromide are caused to react according to the directions of Example 2 with 535 parts by weight of epichlorhydrin, while omitting, however, the addition of the iron filings. After working up 400 parts by weight of tri-(chlorobromopropyl) phosphite are obtained.

We claim:—

1. Process which comprises reacting upon a compound of the general formula:

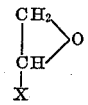

wherein X stands for hydrogen or an alkyl group which may be further substituted by a halogen atom having an atomic weight between 30 and 80 with a compound of the general formula:

wherein Z stands for $\equiv$P or $\equiv$P=O and Hal for a halogen atom of the atomic weight between 30 and 80.

2. Process which comprises reacting upon a compound of the general formula:

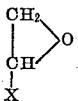

wherein X stands for hydrogen or an alkyl group which may be further substituted by a halogen atom having an atomic weight between 30 and 80 with a compound of the general formula:

wherein Z stands for $\equiv$P or $\equiv$P=O and Hal for a halogen of the atomic weight between 30 and 80 at about the temperature of the boiling point of the alkylene oxide used.

3. Compounds of the general formula:

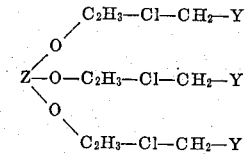

wherein Z stands for $\equiv$P or $\equiv$P=O, and Y stands for hydrogen or a halogen of the atomic weight between 30 and 80, said esters being oily compounds, distillable in vacuo, hydrolizing when boiled with water.

4. The compound of the formula:

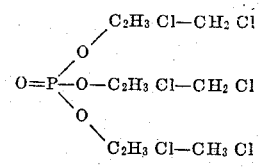

tri(dichloropropyl) phosphate, forming an oil, being distillable in vacuo at 67° C. under a pressure of 2 mm and hydrolizing when boiled with water.

WILHELM LOMMEL.
RUDOLF ENGELHARDT.